United States Patent
Do et al.

(10) Patent No.: US 7,711,041 B2
(45) Date of Patent: May 4, 2010

(54) SIGNAL-TO-INTERFERENCE RATIO ESTIMATION

(75) Inventors: Joo-Hyun Do, Seoul (KR); Hyung-Jin Choi, Seoul (KR); Jung-Su Han, Yongin-si (KR); Jae-Bum Cho, Seoul (KR)

(73) Assignee: Samsung Electronics Co., Ltd., Gyeonggi-do (KR)

( * ) Notice: Subject to any disclaimer, the term of this patent is extended or adjusted under 35 U.S.C. 154(b) by 1182 days.

(21) Appl. No.: 11/254,855

(22) Filed: Oct. 21, 2005

(65) Prior Publication Data
US 2006/0092905 A1 May 4, 2006

(30) Foreign Application Priority Data
Oct. 22, 2004 (JP) .................... 10-2004-0084729

(51) Int. Cl.
 *H04B 1/38* (2006.01)
 *H04L 5/16* (2006.01)

(52) U.S. Cl. .................. 375/222; 375/220; 375/227; 375/341; 370/340

(58) Field of Classification Search .......... 375/222, 375/341; 455/115.1; 370/334, 342
See application file for complete search history.

(56) References Cited

U.S. PATENT DOCUMENTS

| 5,722,051 A * | 2/1998 | Agrawal et al. ............... 455/69 |
| 5,924,043 A * | 7/1999 | Takano ....................... 455/522 |
| 6,426,971 B1 * | 7/2002 | Wu et al. ..................... 375/227 |
| 6,922,532 B2 * | 7/2005 | Simard et al. ................ 398/177 |
| 2005/0111592 A1 * | 5/2005 | Yee ............................. 375/341 |
| 2005/0157684 A1 * | 7/2005 | Ylitalo et al. ................ 370/334 |
| 2006/0083295 A1 * | 4/2006 | Ahmed et al. ................ 375/222 |
| 2007/0173280 A1 * | 7/2007 | Nakayauchi et al. .......... 455/522 |
| 2007/0178931 A1 * | 8/2007 | Tanoue ....................... 455/522 |
| 2008/0159753 A1 * | 7/2008 | Tomofuji et al. ............. 398/192 |

FOREIGN PATENT DOCUMENTS

| KR | 2003-0064879 | 8/2003 |
| KR | 10-2004-0059150 | 7/2004 |

OTHER PUBLICATIONS

J.W. Choi et al., "Adaptive Channel Estimation in DS-CDMA Systems", CM1R23: Jan. 31, 2004.

* cited by examiner

*Primary Examiner*—Chieh M Fan
*Assistant Examiner*—Qutbuddin Ghulamali
(74) *Attorney, Agent, or Firm*—Harness, Dickey & Pierce, P.L.C.

(57) ABSTRACT

In a method of estimating a signal-to-interference ratio (SIR), a first average channel power per slot of a first channel that is under a fading environment is estimated. A second average channel power per slot of a second channel that is under a fading environment substantially the same as the first channel is estimated, wherein the first and second channels are multiplexed. A second signal power attenuation ratio of the second channel is calculated using the second average power per slot of the second channel. A third average power per slot of the first channel is calculated using the first average power per slot of the first channel and a reciprocal of the second signal power attenuation ratio of the second channel.

20 Claims, 7 Drawing Sheets

FIG. 7

| Channel Environment | AWGN / Fading Channel |
|---|---|
| Doppler Frequency | 5.55Hz, 222.222Hz, 462.963Hz |
| Mobile Speed | 3 Km/h, 50 Km/h, 120 Km/h, 250 Km/h |
| Modulation | QPSK |
| Channel Estimation | CPICH Channel Estimation |
| Es/No | 1dB,3dB,5dB,7dB,9dB,11dB,13dB,15dB,17dB |
| Chip Rate | 3.84Mcps |
| Slot Format | 11 |
| DPCH SF/CPICH SF | 128 / 256 |
| Channel Coding | Uncoded |
| Path Number | Single path |

SIGNAL-TO-INTERFERENCE RATIO ESTIMATION

CLAIM OF PRIORITY

A claim of priority is made to Korean Patent Application No. 2004-84729, filed on Oct. 22, 2004, the contents of which are herein incorporated by reference in their entirety for all purposes.

BACKGROUND OF THE INVENTION

1. Field of the Invention

Example embodiments of present invention generally relate to a power control adapted for use in a direct sequence code division multiple access (DS-CDMA) system. More particularly, example embodiments of the present invention relates to a signal-to-interference ratio (SIR) estimation adapted for use in a closed-loop power control.

2. Description of the Related Art

In general, a direct sequence code division multiple access (DS-CDMA) wireless protocol specifies interfaces in wireless communication systems such as a code division multiple access (CDMA) system and a wide-band code division multiple access (W-CDMA) system. In these systems, an accurate power control may be necessary to effectively utilize frequency resources that are commonly shared by a mobile station and a base station according to spread-spectrum characteristics of the wireless communication system.

A system capability, possibly larger in a spread spectrum type system, may be increased when the power is optimally controlled, because the system capability of the CDMA system or the W-CDMA system may be highly correlated with an amount of interference signals received on the system, which may be determined by an intensity of a signal transmitted to/from each mobile device.

The W-CDMA standard is embodied in the 3rd Generation Partnership Project (3GPP) standard. For example, in the first or second generation system, a digital cellular or a personal communication system, data traffic on a reverse link may be substantially equal to data traffic on a forward link, because the first and second generation communication systems were designed to mainly carry speech and low bit-rate data.

However, the third generation communication systems such as W-CDMA are designed to carry not only speech but also packet data having a higher data rate. The third generation communication systems are also adapted to carry higher data-rate wireless Internet services.

One example characteristic of the wireless Internet service is that a forward link may provide a service of downloading a large capacity picture movie, voice data, picture data, and program data. The forward link may have more traffic than a reverse link. Therefore, the traffic on the two links may be asymmetric. In the W-CDMA system, capacity limitation of a mobile device may be more likely to be generated at the forward link rather than the reverse link.

To overcome the capacity limitation, a closed loop power control may be employed in the forward link of the W-CDMA system in the 3GPP standard to efficiently manage resources of the forward link.

The forward closed-loop power control, and those especially based on a signal-to-interference ratio (SIR), may adjust a transmit power of a base station on a forward link based on a received power estimate at a mobile device such that the SIR of each respective mobile device may be constantly maintained. In other words, the transmit power of the base station may be adjusted according to the state of the mobile device, for example by taking into account a near-far effect. Therefore, when the mobile device is not operated (e.g., the mobile device is not connected) but relatively close to a base station or has a relatively low levels of multi-path fading, shadowing, interference from other base stations, etc., transmit power may be reduced. On the other hand, when the mobile device is relatively farther away from the base station, which may create higher bit error rate or a signal reception by the mobile device is poor, the transmit power is increased.

In the closed-loop power control based on the SIR estimation, a reference SIR is compared with an SIR estimate per a predetermined power control period (e.g., 1/1500 sec, in the 3GPP). Therefore, the accuracy of the SIR estimation may greatly affect the stability and accuracy of the transmit power control.

A conventional SIR estimation method in accordance with an NTT DoCoMo wireless protocol is described in "SIR-Based Transmit Power Control of Reverse Link for Coherent DS-CDMA Mobile Radio," IEICE Transactions on Communications, July 1998. According to the above disclosed SIR estimation method, after a tentative decision based on a channel estimation using a pilot symbol, the SIR is estimated using an average power per slot and a mean squared error of a dedicated physical channel (DPCH). The tentative decision herein is made such that a hard decision is made for a phase of a channel compensated received signal to return a phase of a non-channel compensated signal. The tentative decision is used for signal power estimation per slot, using not only a pilot symbol of which a phase is known, but also a random data symbol.

A transmitting signal including the DPCH signal and a common physical channel (CPICH) signal that are coded and multiplexed to be transmitted in parallel may be represented by equation 1, and a received signal passing through a fading channel and Additive White Gaussian Noise (AWGN) may be represented by the following equation 2:

$$S(t) = \sum_{i=-\infty}^{\infty} [\{\sqrt{E_{c,cp}} \cdot G_p \cdot (C^I(t) + jC^Q(t) \cdot (W^I_{CP|i|N1} + W^Q_{CP|i|N1}) +$$
$$\sqrt{E_{c,dp}} \cdot G_p \cdot (D^I(t) +$$
$$jD^Q(t) \cdot (W^I_{DP|i|N2} + W^Q_{DP|i|N2})\} \cdot (S^I_{|i|M} + S^Q_{|i|M})$$

[Equation 1]

$$\tilde{r}(t) = \sum_{i=-\infty}^{\infty} [a(t) \cdot$$
$$[\{\sqrt{E_{c,cp}} \cdot G_p \cdot (C^I(t) + jC^Q(t) \cdot (W^I_{CP|i|N1} + W^Q_{CP|i|N1}) +$$
$$\sqrt{E_{c,dp}} \cdot G_p \cdot (D^I(t) + jD^Q(t)) \cdot$$
$$(W^I_{DP|i|N2} + W^Q_{DP|i|N2})\} \cdot$$
$$(S^I_{|i|M} + S^Q_{|i|M})] \cdot e^{j\theta(t)} + \hat{n}|i|]$$

[Equation 2]

Herein,

Ec,cp, Ec,dp: average chip energy of the CPICH and the DPCH

N1, N2: spreading factor (SF) of the CPICH and the DPCH

M: length of a scrambling code $G_p$: channel gain of the CPICH $W^I CP|i|_{N1}+W^Q CP|i|_{N1}$, $W^I DP|i|_{N2}+W^Q DP|i|_{N2}$: orthogonal variable spreading factor (OVSF) of the CPICH and DPCH $S^I|i|_M+S^Q|i|_M$: scrambling code $\hat{n}|i|$: AWGN α(t), θ(t): amplitude and phase of the received signal due to the fading After performing descrambling and dispreading processes, respective signals of the DPCH and CPICH that are on a chip basis are converted to signals ZDPCH and ZCPICH that are on a symbol basis, which are represented by equations 3 and 4:

$$Z_{DPCH} = \frac{1}{N_2} \sum_{k=0}^{N_2-1} \left[ a(k) \cdot \left[ \sqrt{E_{c,cp}} \cdot (D^I(k) + jD^Q(k)) \right] \cdot e^{j\theta(k)} \right] + \frac{1}{N_2} \sum_{k=0}^{N_2-1} W_{dp|k|}$$ [Equation 3]

$$Z_{CPICH} = \frac{1}{N_1} \sum_{k=0}^{N_1-1} \left[ a(k) \cdot \left[ \sqrt{E_{c,cp}} \cdot (C^I(k) + jC^Q(k)) \right] \cdot e^{j\theta(k)} \right] + \frac{1}{N_1} \sum_{k=0}^{N_1-1} W_{cp|k|}$$ [Equation 4]

Herein, $$W_{DP}|i| = (n^I|i| + n^Q|i|) \cdot (S^I|i|_M + S^Q|i|_M)^* \cdot (W^I_{DP}|i|_{N_2} + W^Q_{DP}|i|_{N_2})^*$$

$$W_{CP}|i| = (n^I|i| + n^Q|i|) \cdot (S^I|i|_M + S^Q|i|_M)^* \cdot (W^I_{DP}|i|_{N_1} + W^Q_{DP}|i|_{N_1})^*$$

After a tentative decision is made for the DPCH symbol, the DPCH symbol is rewritten as equation 5 and the signal power at the time of the SIR estimation is represented as the average power of the DPCH symbol per slot, for which the tentative decision is made as in equation 6:

$$\hat{Z}_{DPCH} = \sqrt{E_{c,dp}} \cdot \frac{1}{N_2} + j \left[ \sqrt{E_{c,dp}} \cdot \frac{1}{N_2} \sum_{k=0}^{N_2-1} [a(k) \cdot \sin\theta(k)] \right] + \frac{1}{N_2} \sum_{k=0}^{N_2-1} Z^I_{|k|} + Z^Q_{|k|}$$ [Equation 5]

$$E[\hat{Z}_{DPCH}]^2_{slot} = E_{c,dp} \cdot \left[ \left( \frac{1}{S_2} \frac{1}{N_2} \sum_{s=0}^{S_2-1} \sum_{k=0}^{N_2-1} [a(s,k) \cdot \cos\theta(s,k)] \right)^2 + \left( \frac{1}{S_2} \frac{1}{N_2} \sum_{s=0}^{S_2-1} \sum_{k=0}^{N_2-1} [a(s,k) \cdot \cos\theta(s,k)] \right)^2 \right] = E_{c,dp} \cdot K_{DPCH}$$ [Equation 6]

Herein, $$Z|k| = Z^I|k| + Z^Q|k| = w|k| \cdot (D^I(K) + jD^Q(K))^*$$

$S_2$: a number of DPCH symbols per slot
average AWGN per slot:

$$\frac{1}{S_2} \frac{1}{N_2} \sum_{s=0}^{S_2-1} \sum_{k=0}^{N_2-1} (Z^I_{|s,k|} + jZ^Q_{|s,k|}) \cong 0$$

It can be determined from equation 6 that the signal power is affected by the fading with a signal power attenuation ratio KDPCH. The signal power affected by the fading with the signal power attenuation ratio KDPCH can be experimentally identified.

FIG. 1 is a graph illustrating a power attenuation of a signal on a dedicated physical channel (DPCH) that undergoes fading.

Referring to FIG. 1, as the fading becomes faster, the power attenuation of a signal becomes greater. Compared with an ideal case where there is no fading (101), the signal power attenuation is generated when a mobile device is moving at a speed of about 120 km/h (103) and when a mobile device is moving at a speed of about 250 km/h (105).

When energy per symbol to interference power density ratio (Es/No) is low, the AWGN may not approach zero, which may generate an error between an actual signal power attenuation and a calculated value by the signal power attenuation ratio KDPCH. When the energy per symbol to interference power density ratio (Es/No) is relatively high, the AWGN may approach zero so that the signal power attenuation is nearly equal to the signal power attenuation ratio KDPCH.

Therefore, in the conventional SIR estimation method, the SIR estimation may not be sufficiently accurate due to the signal power attenuation of a received signal in the fading environment, especially in a fast fading environment. Accordingly, accurate power control depending on a state of a wireless mobile channel may be difficult.

SUMMARY OF THE INVENTION

In an embodiment of the present invention, a method of estimating a signal-to-interference ratio (SIR) includes estimating a first average channel power per slot of a first channel that is under a fading environment, estimating a second average channel power per slot of a second channel that is under a fading environment substantially the same as the fading environment of the first channel, calculating a second signal power attenuation ratio of the second channel using the second average channel power per slot of the second channel, and calculating a third average channel power per slot of the first channel using the first average channel power per slot estimate and a reciprocal of the second signal power attenuation ratio of the second channel.

In another embodiment of the present invention, a method of estimating a signal-to-interference ratio (SIR) includes estimating a first average channel power per slot of a first channel that is under a fading environment, estimating a second average channel power per slot of a second channel that is under a fading environment substantially the same as the fading environment of the first channel, calculating a second signal power attenuation ratio of the second channel using the second average channel power per slot of the second channel, calculating a third average channel power per slot of the first channel using a result of a multiplication of the first average channel power per slot estimate and a reciprocal of the second signal power attenuation ratio of the second channel, estimating a signal-to-interference ratio (SIR) using the third average channel power per slot of the first channel that compensates for the signal power attenuation of the first channel, and comparing the estimated signal-to-interference ratio (SIR) with a reference signal-to-interference ratio (SIR) to generate a power control signal according to a comparison result.

Also in another embodiment of the present invention, an apparatus to estimate a signal-to-interference ratio (SIR), the apparatus includes a first signal power estimation unit configured to estimate a first average signal power per slot of a first channel, a second channel signal power estimation unit configured to estimate a signal power attenuation ratio of a second channel, a signal power compensation unit configured to output a compensated third average channel power per slot of the first channel by multiplying a reciprocal of the signal power attenuation ratio of the second channel by the first average channel power per slot of the first channel, an interference power estimation unit configured to estimate an interference power of the first channel, and a signal-to-interference calculation unit configured to calculate the signal-to-interference ratio (SIR) by dividing the compensated third average channel power per slot that are summed for respective paths with the interference power of the first channel that are summed for respective paths.

BRIEF DESCRIPTION OF THE DRAWINGS

Example embodiments of the present invention will become more apparent with the following description with reference to the attached drawings. In the drawings like elements are represented by like reference numerals. The drawings are given by way of illustration only and thus do not limit the example embodiments of the present invention.

FIG. 7 illustrates conditions of various parameters under which simulations results for FIGS. 4, 5B and 6B are generated.

DESCRIPTION OF THE EXAMPLE EMBODIMENTS

Figure 1:
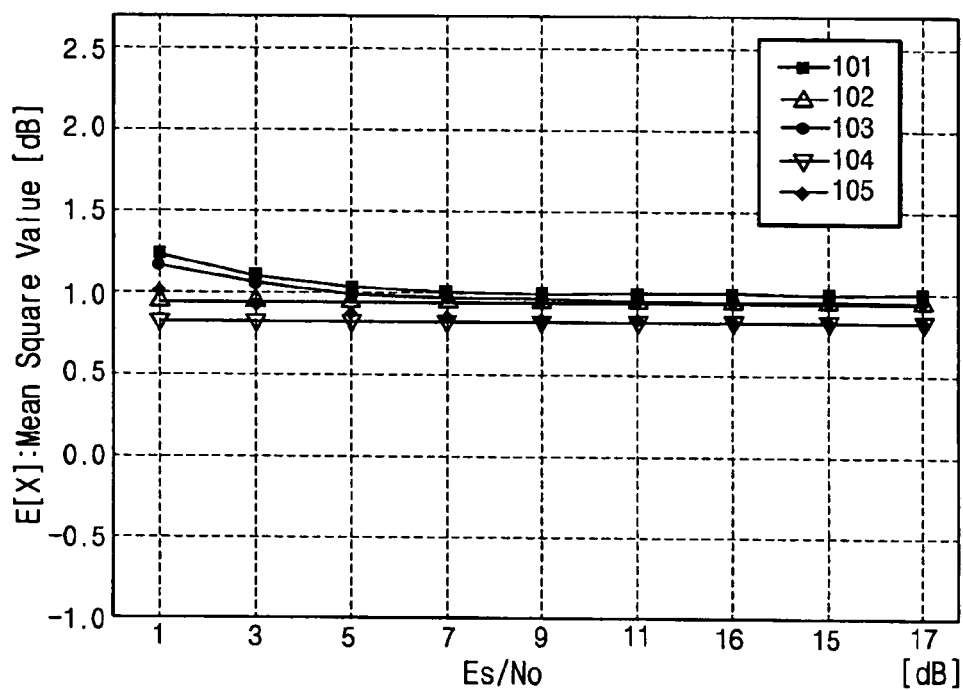
FIG. 1 is a graph illustrating a power attenuation of a signal on a dedicated physical channel (DPCH) that undergoes fading.

Hereinafter, example embodiments of the present invention will be explained in detail with reference to the accompanying drawings.

It will be understood that, although the terms first, second, etc. may be used herein to describe various elements, these elements are not limited by these terms. These terms are only used to distinguish one element from another. For example, a first element could be termed a second element, and, similarly, a second element could be termed a first element, without departing from the scope of the example embodiments of the present invention. As used herein, the term "and/or" includes any and all combinations of one or more of the associated listed items.

It will be understood that when an element is referred to as being "connected" or "coupled" to another element, it can be directly connected or coupled to the other element or intervening elements may be present. In contrast, when an element is referred to as being "directly connected" or "directly coupled" to another element, there are no intervening elements present. Other words used to describe the relationship between elements should be interpreted in a like fashion (i.e., "between" versus "directly between", "adjacent" versus "directly adjacent", etc.).

The terminology used herein is for the purpose of describing particular embodiments only and is not intended to be limiting of the present invention. As used herein, the singular forms "a", "an" and "the" are intended to include the plural forms as well, unless the context clearly indicates otherwise. It will be further understood that the terms "comprises", "comprising", "includes" and/or "including", when used herein, specify the presence of stated features, integers, steps, operations, elements, and/or components, but do not preclude the presence or addition of one or more other features, integers, steps, operations, elements, components, and/or groups thereof.

Unless otherwise defined, all terms (including technical and scientific terms) used herein have the same meaning as commonly understood by one of ordinary skill in the art to which this invention belongs. It will be further understood that terms, such as those defined in commonly used dictionaries, should be interpreted as having a meaning that is consistent with their meaning in the context of the relevant art and will not be interpreted in an idealized or overly formal sense unless expressly so defined herein.

In a W-CDMA standard, a first channel for which a signal-to-interference ratio (SIR) is to be estimated may be a dedicated physical channel (DPCH). In addition, a second channel that is used to compensate signal power attenuation at the first channel may be a common pilot channel (CPICH).

When the CDMA system is based on a communication protocol such as IS-95, the first channel may be a traffic channel and the second channel may be a pilot channel.

In one example embodiment of the present invention, a direct sequence code division multiple access (DS-CDMA) standard may be based on a W-CDMA standard. A signal power attenuation of the DPCH caused by fading may be compensated by a reciprocal of a signal power attenuation ratio of, for example, the CPICH.

The signal attenuation ratio of the CPICH, which is influenced by the fading along with the DPCH, may be estimated to compensate for the signal power attenuation of the DPCH signal.

The CPICH has a signal power attenuation ratio substantially equal to the signal power attenuation ratio of the DPCH, because both the DPCH and the CPICH channel are under the same fading environment. Therefore, the signal power attenuation of the CPICH may be compensated by using the reciprocal of the signal power attenuation ratio of the CPICH in calculating the power of a signal.

An average power of a CPICH symbol ZCPICH per slot may be expressed by equation 7, using equation 4:

$$E[Z_{CPICH}]^2_{slot} = \frac{1}{2} \cdot E_{c,cp} \cdot \quad \text{[Equation 7]}$$

$$G_p^2 \cdot \left[ \left( \frac{1}{S_1} \frac{1}{N_1} \sum_{s=0}^{S_1-1} \sum_{k=0}^{N_1-1} [a(s,k) \cdot \{\cos\theta(s,k) - \sin\theta(s,k)\}] \right)^2 \right.$$

$$+$$

$$\left. \left( \frac{1}{S_1} \frac{1}{N_1} \sum_{s=0}^{S_1-1} \sum_{k=0}^{N_1-1} [a(s,k) \cdot \{\sin\theta(s,k) + \cos\theta(s,k)\}] \right)^2 \right]$$

-continued $$= E_{c,cp} \cdot G_p^2 \cdot K_{CPICH}$$

Since the signal power of the CPICH may be affected by substantially the same fading as the DPCH, the signal power attenuation ratio KDPCH of the DPCH may be equal to the signal power attenuation ratio KCPICH of the CPICH, which is identified by equation 8:

$$K_{CPICH} = \frac{1}{2} \cdot \left[ (\bar{a}(s,k) \cdot \cos\bar{\theta}(s,k) - \bar{a}(s,k) \cdot \sin\bar{\theta}(s,k))^2 + \right.$$ [Equation 8]
$$\left. (\bar{a}(s,k) \cdot \cos\bar{\theta}(s,k) + \bar{a}(s,k) \cdot \sin\bar{\theta}(s,k))^2 \right] =$$
$$\bar{a}(s,k)^2 = \left[ (\bar{a}(s,k) \cdot \cos\bar{\theta}(s,k))^2 + (\bar{a}(s,k) \cdot \sin\bar{\theta}(s,k))^2 \right] =$$
$$K_{DPCH}$$

Generally, a signal power of the CPICH (a pilot channel) may be greater than the signal power of the DPCH. For example, in a 3GPP system, the signal energy of the CPICH may be greater than the signal energy of the DPCH by about 7 dB so that the CPICH has more channel gain compared to the DPCH. When a difference in channel gain between the CPICH and the DPCH is defined as Gp, the effect of the difference in channel gain Gp requires elimination to compensate for the power attenuation in the DPCH by using the signal power attenuation ratio of the CPICH.

Therefore, the average power per slot of a square of the CPICH symbol ZCPICH and equation 7 may be used to remove the effect of the Gp. The average power per slot for the square of the CPICH symbol ZCPICH may be calculated as per equation 9:

$$E[Z_{CPICH})^2]_{slot} = E_{c,cp} \cdot G_p^2 \cdot \frac{N_0}{N_1}$$ [Equation 9]

Herein, $N_0$ denotes noise variance.

It may be determined from equation 9 that the average power per slot for the square of the CPICH symbol ZCPICH is not interfered by fading, but rather influenced by AWGN (N0/N1).

A ratio of the average power per slot of the square of the CPICH symbol in equation 9 to the average power per slot of the CPICH in equation 7 may be expressed as equation 10:

$$\hat{\delta}(l,k) = \frac{E[(Z_{CPICH})^2]_{slot}}{E[Z_{CPICH}]_{slot}^2} = \frac{1}{K_{CPICH}} + \frac{1}{K_{CPICH}} \cdot \frac{N_0}{N_1}$$ [Equation 10]

Because the effect of the AWGN is reduced by a spreading factor N1 of the CPICH and the channel gain Gp, N0/N1 may approach zero so that $$\hat{\delta}(l,k) \cong \frac{1}{K_{CPICH}},$$

and using equation 6, the average power per slot in the DPCH symbol slot may be calculated as per equation 11:

$$E[\hat{Z}_{DPCH}]_{slot}^2 = E_{c,cp} \cdot K_{DPCH} \cdot \frac{1}{K_{CPICH}} = E_{c,cp}$$ [Equation 11]

Namely, as it may be determined by equation 11, the signal power of the DPCH may be multiplied by the reciprocal 1/KCPICH of the signal power attenuation ratio LCPICH due to the fading on the CPICH to compensate for the signal power attenuation of the DPCH.

Figure 2:
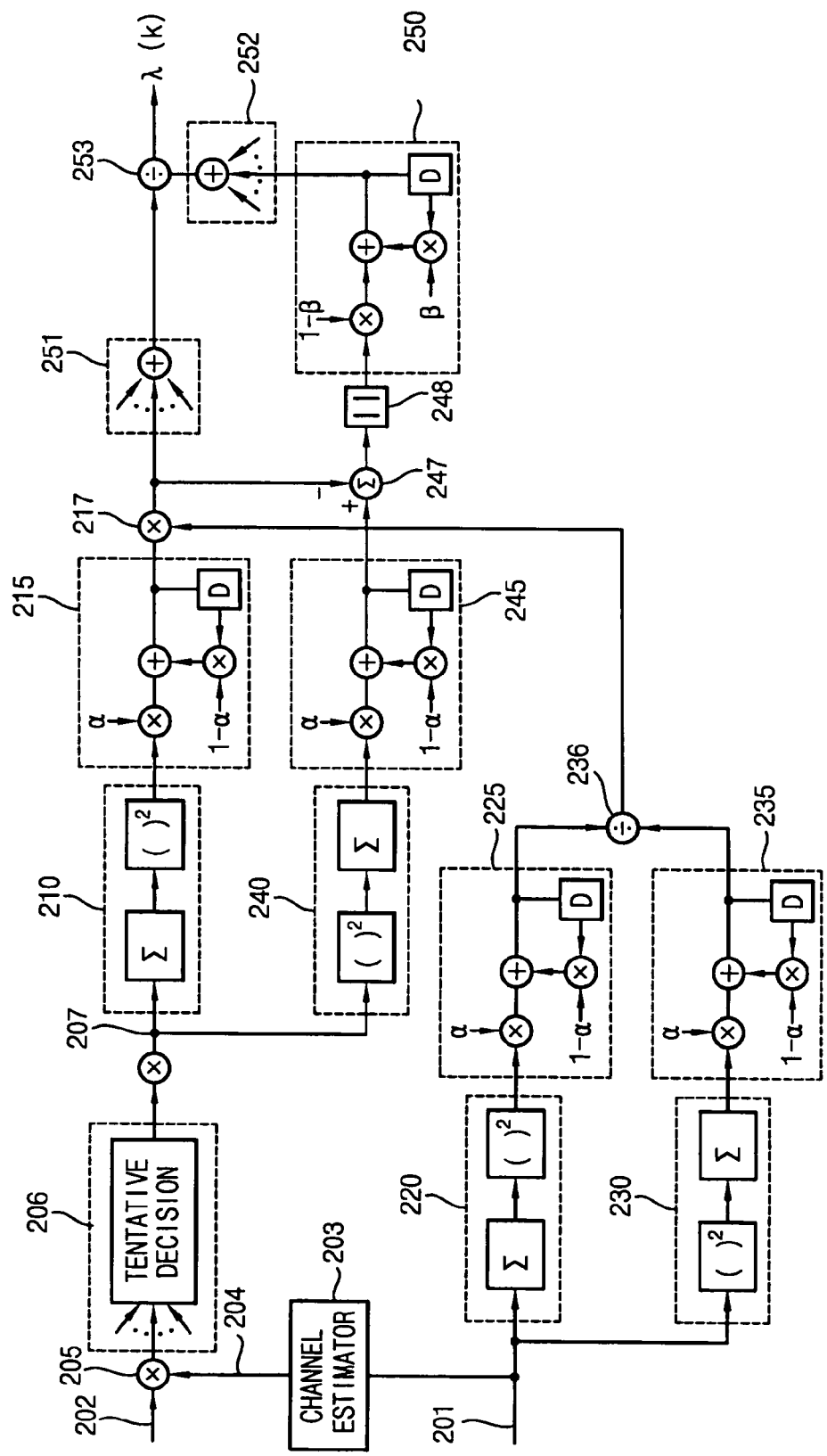
FIG. 2 is a block diagram illustrating a method of measuring a signal-to-interference ratio (SIR) according to an example embodiment of the present invention.

FIG. 2 is a block diagram illustrating a method of measuring a signal-to-interference ratio (SIR) according to an example embodiment of the present invention.

Referring to FIG. 2, a channel estimator 203 may receive a despread CPICH signal 201 to output a channel estimate 204. The channel estimate 204 and a despread DPCH signal 202 are complexes which may be multiplied in a multiplier 205 so that compensation is performed for a phase error due to a fading channel. After compensating for phase errors of the channel estimate 204 and the despread DPCH signal 202 for each respective path, a DPCH data symbol 207 may be rake combine, and a tentative decision 206 is performed on the DPCH data symbol 207. The DPCH data symbol 207 on which the tentative decision has been performed is applied to a first calculating unit 210.

The first calculating unit 210 may include a power calculator and a squarer to calculate an average power of a DPCH slot as per equation 6.

A result of the first calculating unit 210 may be output to a filter unit 215. The filter unit 215 may include a low pass filter (not shown) that is implemented as a first order linear filter of an infinite impulse response (IIR) type. The filter unit 215 may be used to stabilize the effect of fading to improve jitter characteristics of SIR. Therefore, the effect of the fading at the time the SIR estimation is performed should be taken into account when designing the filter unit 215.

When a filter coefficient α is less than 0.5, the fading at a previous time may have a greater influence than the fading at the time the SIR estimation is performed so that the fading associated with the SIR estimation may not be accurately reflected. Therefore, in one example embodiment, the filter coefficient α may be set as 0.7 to reflect the fading at the time the SIR estimation is performed. It is noted that the filter coefficient α may be varied to optimize for each communication system.

When an nth symbol of a kth slot in an lth path that is multiplied with an OVSF code of the DPCH is defined as dl(n,k) and the nth symbol of the kth slot in an lth path that is multiplied with the OVSF code of the CPICH is defined as cl(n,k), the average power per slot of the DPCH signal passing through the filter unit 215 may be expressed by equation 12:

$$\hat{S}_{dp,l}(k) = (1-\alpha) \cdot \tilde{S}_{dp,l}(k-1) + $$ [Equation 12]
$$\alpha \cdot \left| \frac{1}{S_2} \left[ \sum_{n=0}^{N_p} \hat{d}_l(n,k) e^{-j(\pi/4)} + \sum_{n=N_p}^{S_2-1} \hat{d}_l(n,k) e^{-j\hat{\phi}(n,k)} \right] \right|^2$$

Herein,
$\hat{\phi}(n,k)$: a phase for the tentative decision
$\hat{d}_l(n,k)$: a DPCH symbol that is channel compensated for using the CPICH channel estimation
Np: a number of pilot symbols in a slot of the DPCH channel The phase for the tentative decision $\hat{\phi}(n,k)$ and DPCH symbol compensated using the CPICH channel estimation $\hat{d}_1(n,k)$ may be respectively expressed by equations 13 and 14:

$$\hat{\phi}(n, k) = \max\left[\phi \in \{m_\pi/2; m = 0 - 3\}, \operatorname{Re}\left[\hat{d}_l(n, k)' e^{-j\phi}\right] + \frac{\pi}{4}\right] \quad \text{[Equation 13]}$$

$$\hat{d}_l(n, k) = \sum_{l=0}^{L-1} \hat{d}_l(n, k) \cdot \hat{\xi}_l(k)^*, \; 0 \le n \le M-1 \quad \text{[Equation 14]}$$

Herein,

L: a number of paths $\xi_1(k)$: channel estimation

M: a number of total symbols in a slot of the DPCH

A second calculating unit 220 and a third calculating unit 230 may respectively calculate a reciprocal of the signal power attenuation ratio of the CPICH to compensate for the attenuation of the signal power of the DPCH signal (equation 12) that may be caused by the fading.

The second calculating unit 220 may include a power calculator and a squarer to calculate an average power of the CPICH slot as per equation 7.

The third calculating unit 230 may include a squarer and a power calculator to calculate an average power per slot of a square of the CPICH symbol as per equation 9.

Results of the second and third calculating units 220 and 230 are respectively applied to filter units 225 and 235. The filter units 225 and 235 may include a low pass filter (not shown) that may be implemented as a first order filter. The filter units 225 and 235 are used to stabilize the effect of the fading to improve the jitter characteristics of SIR, as described above.

The outputs of the filter units 225 and 235 may be provided to a division unit 236 to generate the reciprocal of the power attenuation ratio of the CPICH signal that may be used to compensate for the power attenuation of the DPCH.

$$\hat{\delta}_l(k) = \frac{\tilde{U}_{cp,l}(k)}{\tilde{S}_{cp,l}(k)} \quad \text{[Equation 15]}$$

In equation 15, a numerator on the right hand side of equal sign represents the average power per slot of a square of the CPICH symbol (equation 9) passing through the filter unit 235, which may be expressed by the following equation 16:

$$\tilde{U}_{cp,l}(k) = (1-\alpha) \cdot \tilde{U}_{cp,l}(k-1) + \alpha \cdot \left|\frac{1}{S_1}\left[\sum_{n=N_p}^{S_1-1} [c_l(n,k)]^2\right]\right| \quad \text{[Equation 16]}$$

Herein, Np represents a number of pilot symbols in a slot of the DPCH. In equation 15, a denominator on the right hand side equal sign represents the average power per slot of the CPICH (equation 7) passing through the filter unit 225, which may be expressed by equation 17:

$$\tilde{S}_{cp,l}(k) = (1-\alpha) \cdot \tilde{S}_{cp,l}(k-1) + \alpha \cdot \left|\frac{1}{S_1}\left[\sum_{n=N_p}^{S_1-1} [c_l(n,k)]^2\right]\right| \quad \text{[Equation 17]}$$

Herein, Np represents a number of pilot symbols in a slot of the DPCH. The average signal power in each slot of DPCH (equation 12) passing through the first calculating unit 210 and the filter unit 215 may be multiplied with the reciprocal of the signal power attenuation ratio of the CPICH (equation 15) output from the division unit 236 by a multiplication unit 217.

The multiplication unit 217 may output an average signal power per slot of the DPCH that compensates for the fading. The average signal power per slot of the DPCH may be calculated by equation 18:

$$\hat{S}_{dp,l}(k) = \tilde{S}_{dp,l}(k) \cdot \hat{\delta}_l(k) \quad \text{[Equation 18]}$$

The DPCH data symbol 207 that compensates for a phase error with respect to each respective path may be then rake combined and a tentative decision is made for the DPCH data symbol 207. The DPCH data symbol 207 may be provided to a fourth calculating unit 240, in addition to being provided to the first calculating unit 210.

The fourth calculating unit 240 may include a squarer and an average power calculator to calculate an average power per slot of a square of the DPCH symbol.

A result of the fourth calculating unit 240 may be provided to a filter unit 245. The filter unit 245 may include a low pass filter (not shown) implemented as a first order linear filter of the infinite impulse response (IIR) type for use in stabilizing the effect of the fading to improve the jitter characteristics of SIR, as described above.

A subtraction unit 247 subtracts an output of the multiplication unit 217 with an output of the filter unit 245. Therefore, an output of the subtraction unit 247 may be an interference power of the DPCH. The output of the subtraction unit 247 may be calculated by equation 19:

$$\hat{I}_l(k) = \tilde{U}_{dp,l}(k) - \hat{S}_{dp,l}(k) \quad \text{[Equation 19]}$$

Herein, $$\tilde{U}_{dp,l}(k) = (1-\alpha) \cdot \tilde{U}_{dp,l}(k-1) + \alpha \cdot \left|\left[\frac{1}{M}\sum_{n=0}^{M-1}\left[s_l(n,k)e^{-j\hat{\phi}(n,k)}\right]^2\right]\right|$$

M: a number of total symbols in a slot of the DPCH

The output of the subtraction unit 247 may be converted to an absolute value by an absolute value calculating unit 248, and the absolute value may be provided to a filter unit 250. The filter unit 250 may include a low pass linear filter (not shown) implemented as an IIR type first order filter. The filter unit 250 may have a filter coefficient β that is a forgetting factor. In one example embodiment of the present invention, the filter coefficient β may be set as about 0.99375. It is noted that the filter coefficient β may be varied to optimize for each communication system. The interference power passing through the filter unit 250 may be calculated by equation 20:

$$\hat{I}_l(k) = \beta \hat{I}_l(k-1) + (1-\beta)\hat{I}_l(k) \quad \text{[Equation 20]}$$

The signal power and the interference power of each of the respective paths 251 and 252 are combined before SIR estimation. The signal power and the interference power are represented by equation 21:

$$\bar{I}(k) = \sum_{l=0}^{L-1} \hat{I}_l(k)$$ [Equation 21]

$$\bar{S}(k) = \sum_{l=0}^{L-1} \hat{S}_l(k)$$

The signal power and the interference power combined at each of the respective paths 251 and 252 are divided by a division unit 253 to produce the SIR. The calculated SIR may be represented by equation 22:

$$\lambda(k) = \bar{S}_I(k)/\bar{I}_I(k)$$ [Equation 22]

In a closed-loop power control according to an example embodiment of the present invention, the SIR estimate for an example embodiment of the present invention may be compared with a reference SIR every period of the closed-loop power control, and a power control signal TPC command may be transmitted to a corresponding receiver or transmitter to allow the corresponding receiver or transmitter to control a receiving power thereof.

In a W-CDMA communication system, the closed-loop power control may be performed in a period of $1/1500$ sec to control power on a slot-by-slot basis, e.g., every slot, so that the power control signal TPC generated by the SIR estimation according to an example embodiment of the present invention may be transmitted to a corresponding receiver or transmitter every $1/1500$ sec. For example, in a forward link closed-loop power control, a mobile station may estimate the SIR of a received signal and transmit the power control signal TPC to a base station to control a transmitting power of the base station.

Figure 3:
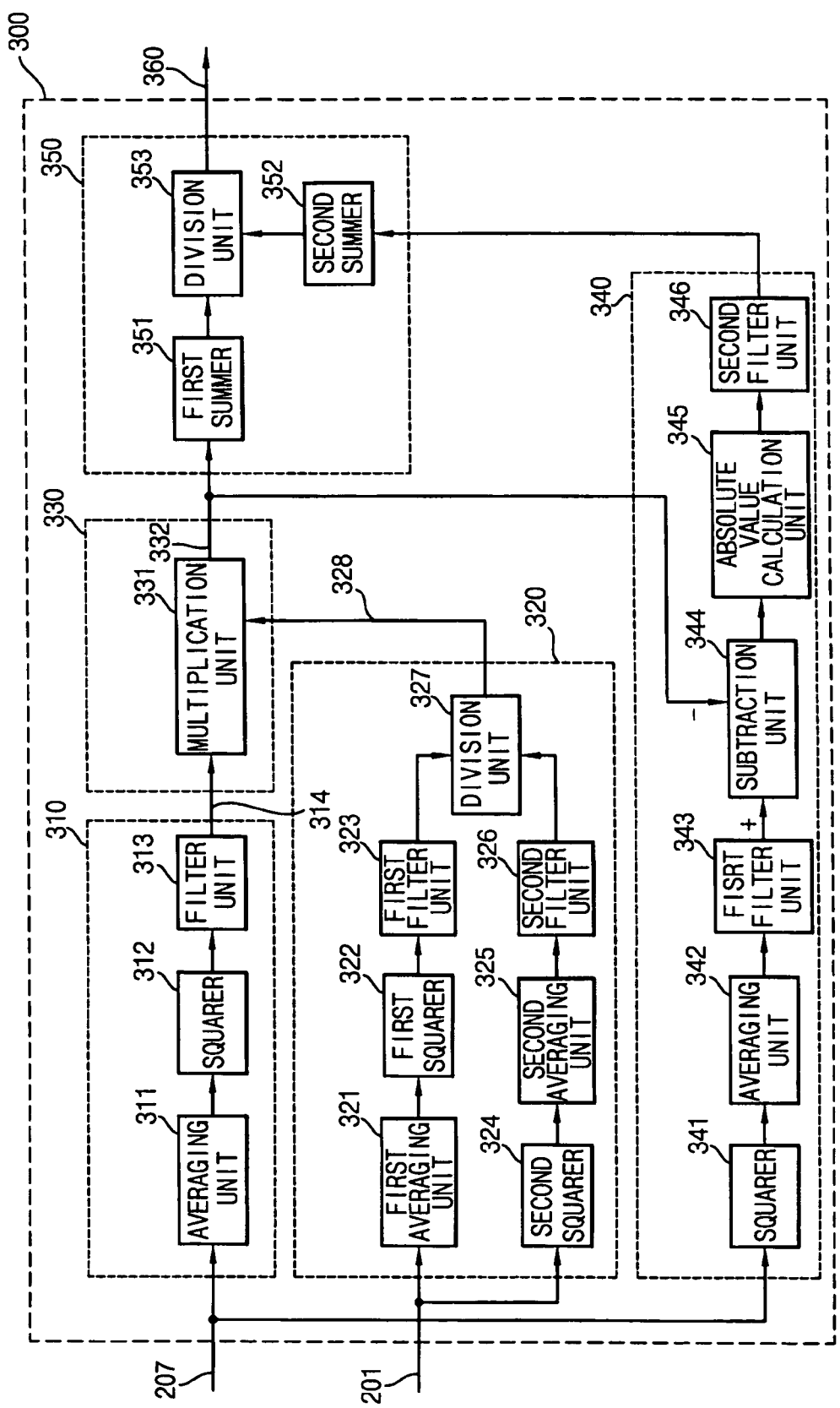
FIG. 3 is a block diagram illustrating an apparatus to measure an SIR according to an example embodiment of the present invention.

FIG. 3 is a block diagram illustrating an apparatus for measuring SIR according to an example embodiment of the present invention.

The apparatus for SIR estimation according to an example embodiment of the present invention may include a first channel signal power estimation unit 310, a second channel signal power estimation unit 320, a first channel signal power compensation unit 330, a first channel interference power estimation unit 340 and a signal-to-interference calculation unit 350.

After a DPCH data symbol 207 compensates for the phase error by a channel estimate with respect to each path, may be rake combined and a tentative decision may be made for the DPCH data symbol 207, the DPCH data symbol 207 may be input to the first channel signal power estimation unit 310. The first channel signal power estimation unit 310 may be used to estimate an average signal power per slot of the DPCH.

The first channel signal power estimation unit 310 may include an averaging unit 311 to calculate an average power per slot of the DPCH data symbol 207, a squarer 312 to calculate an average power per slot of the DPCH data symbol 207 by squaring the average power per slot of the DPCH data symbol 207 and a filter unit to stabilize the fading for the average power per slot of a squared DPCH data symbol 207. The filter unit 313 may include a low pass linear filter that is implemented as an IIR type first order filter as described with respect to FIG. 2. The filter unit 313 may be used to stabilize the effect of the fading to improve the jitter characteristics of SIR.

The second channel signal power estimation unit 320 may be used to calculate a reciprocal of the CPICH signal power attenuation ratio to compensate for the signal power attenuation in the DPCH.

The second channel signal power estimation unit 320 may receive a despread CPICH data symbol 201.

The second channel signal power estimation unit 320 may include a first averaging unit 321 to calculate an average power per slot of the CPICH data symbol 201, a first squarer 322 to calculate an average power of the CPICH slot by squaring the average power per slot of the CPICH data symbol 201, and a first filter unit 323 to stabilize the fading for the average power per slot of a squared DPICH data symbol 201. The first filter unit 323 may include a low pass linear filter that is implemented as an IIR type first order filter. The filter unit 323 may be used to stabilize the effect of the fading to improve the jitter characteristics of SIR.

In addition, the second channel signal power estimation unit 320 may include a second squarer 324 to square the CPICH data symbol 201, a second averaging unit 325 to calculate an average power per slot of the CPICH data symbol 201, a second filter unit 326 to stabilize the fading for the average power per slot of a squared DPICH data symbol 201. The second filter unit 326 may include a low pass linear filter that is implemented as an IIR type first order filter. The second filter unit 326 may be used to stabilize the effect of the fading to improve the jinter characteristics of SIR.

The first and second filter units 323 and 326 may respectively include a low pass linear filter that is implemented as an IIR type first order filter as described with respect to FIG. 2.

The second channel signal power estimation unit 320 may further include a division unit 327 to divide an output of the second filter unit 326 by an output of the first filter unit 323 to generate a reciprocal 328 of the CPICH signal power attenuation ratio.

The first channel signal power compensation unit 330 may be used to compensate for the fading effect on an average signal power 314 of the DPCH slot output from the first channel signal power estimation unit 310.

The first channel signal power compensation unit 330 may include a multiplication unit 331 that multiplies the reciprocal 328 of the CPICH signal power attenuation ratio output from the second channel signal power estimation unit 320 by the average signal power 314 of the DPCH slot output from the first channel signal power estimation unit 310. Therefore, the first channel signal power compensation unit 330 may output a compensated average power 332 per slot of the first channel.

The first channel interference power estimation unit 340 may be used to estimate the interference power of the DPCH for SIR estimation.

The first channel interference power estimation unit 340 may receive the DPCH data symbol 207 that compensates for a phase error with respect to each path, may be rake combined and for which a tentative decision may be made.

The first channel interference power estimation unit 340 may include a squarer 341 to square the DPCH data symbol 207, an averaging unit 342 to calculate an average power per slot of the DPCH data symbol 207, a first filter unit 343 to stabilize the fading for the average power per slot of the squared DPCH data symbol 207. The first filter unit 343 may include a low pass filter that is implemented as an IIR type first order filter as described with respect to FIG. 2.

The first channel interference power estimation unit 340 may further include a subtraction unit 344, an absolute value calculating unit 345, and a second filter unit 346.

The subtraction unit 344 may subtract the compensated average power 332 from an output of the first filter unit 343 to generate the interference power of the DPCH channel.

The absolute value calculating unit 345 may generate an absolute value of an output of the subtraction unit 344. The filter unit 346 that receives the output of the subtraction unit 344 may include a low pass filter implemented as an IIR type first order filter having a forgetting factor.

The signal-to-interference ratio (SIR) calculation unit 350 may combine the DPCH channel signal power and the interference power for respective associated paths to generate the SIR.

The signal-to-interference ratio (SIR) calculation unit 350 may include a first summer 351, a second summer 352, and a division unit 353.

The first summer 351 may sum respective compensated average power 332 per slot for a DPCH channel for respective associated paths. The second summer 352 may sum respective interference power of the DPCH channel for respective associated paths. The division unit 353 may divide an output of the first summer 351 by an output of the second summer 352 to output the SIR 360.

It is very well known in the art that a system module may be easily combined with other various components and functions. Therefore, it will be understood that portions of elements according to example embodiments of the present invention may be combined to form a functional group, which may be referred to by a different name.

Therefore, it is noted that the respective elements of the apparatus for SIR estimation shown in FIG. 3 are given only for illustrative purposes as each functional group and therefore, two or more elements may be combined to form a new functional group referred to by a different name.

Figure 4:
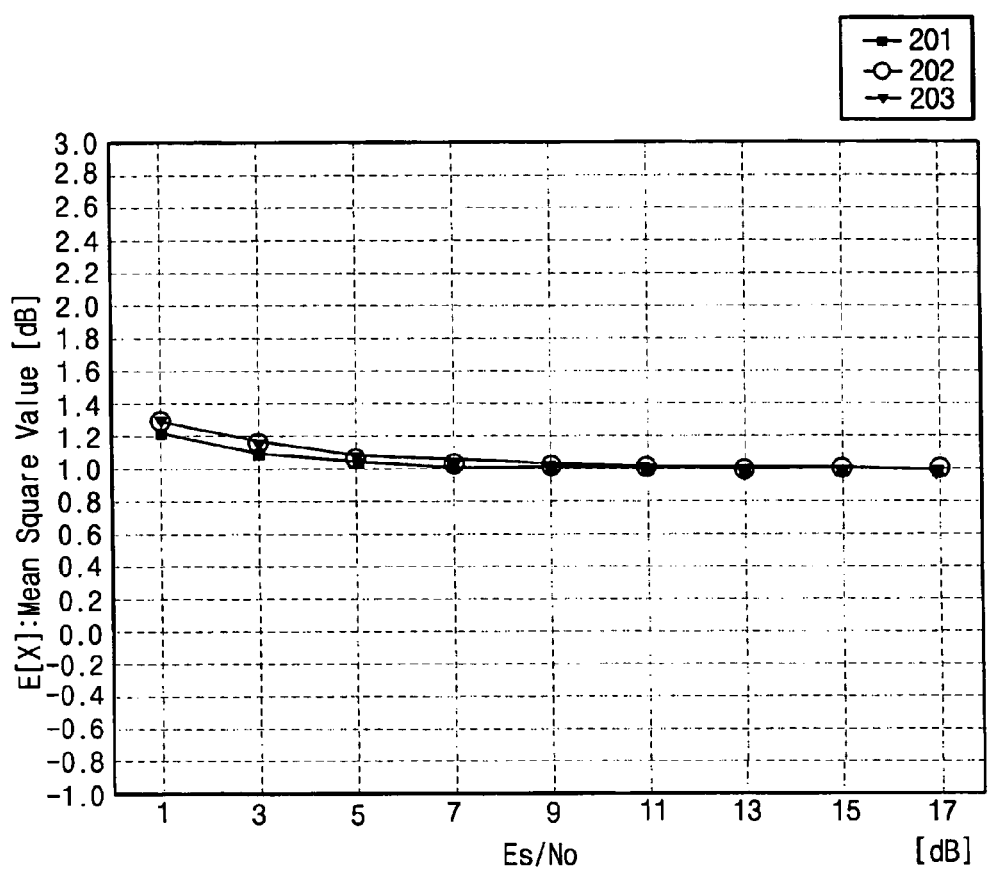
FIG. 4 is a graph illustrating power on a dedicated physical channel (DPCH) according to an example embodiment of the present invention.

FIG. 4 is a graph illustrating a signal power of a DPCH signal according to an example embodiment of the present invention.

Referring to FIG. 4, the signal power attenuation of the DPCH may be compensated for by the SIR estimation according to an example embodiment of the present invention. For a mobile device moving at a speed of about 120 km/h (202) and a mobile device moving at a speed of about 250 km/h (203), the signal power attenuation due to fading may be compensated to exhibit an accurate signal power attenuation. Namely, compared with an ideal case where there no fading exists (201), there is little difference for 202 and 203.

Therefore, not only in a slow fading but also in a fast fading environment, the SIR may be accurately estimated by compensating for the signal power attenuation of the DPCH.

Figure 5A:
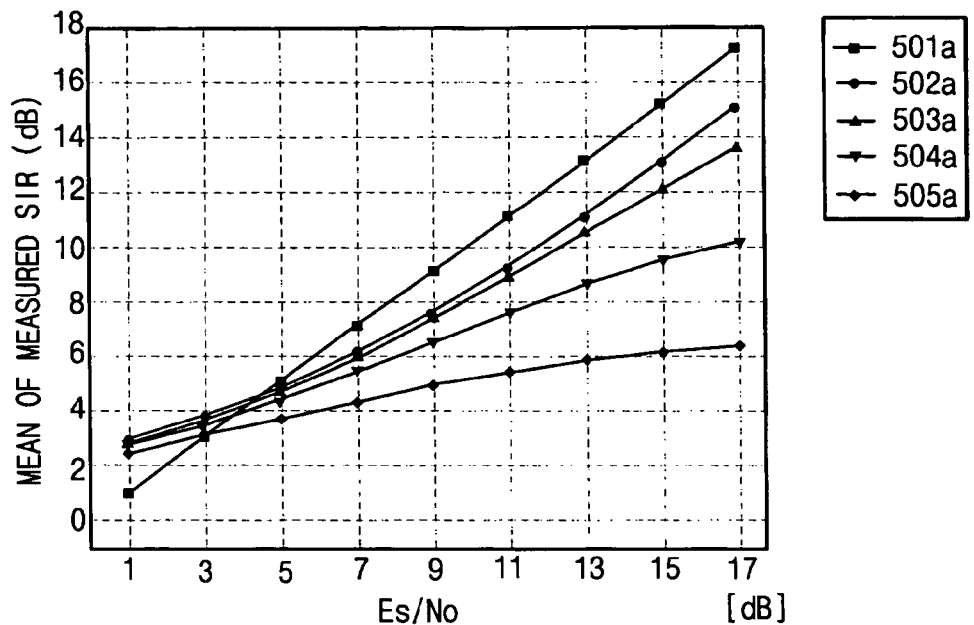
FIGS. 5A and 5B are graphs illustrating measured SIR results for a conventional SIR estimation method and for an example embodiment of the present invention, respectively.
Figure 5B:
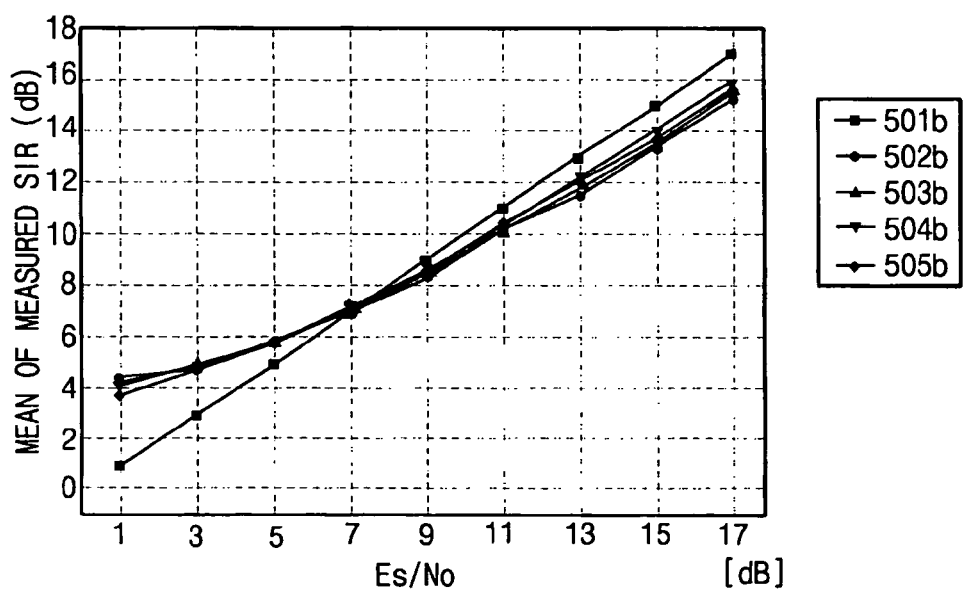

FIGS. 5A and 5B are graphs showing measured SIR results for a conventional SIR estimation method and for an example embodiment of the present invention.

In FIG. 5A, the SIR measurement according to the conventional SIR estimation may be carried out without fading (501a), for a mobile device moving at a speed of about 3 km/h (502a), for a mobile device moving at a speed of about 50 km/h (503a), for a mobile device moving at a speed of about 120 km/h (504a) and for a mobile device moving at a speed of about 250 km/h (505a).

Similarly, referring to FIG. 5B, the SIR measurement according to an example embodiment of the present invention may be carried out without fading (501b), for a mobile device moving at a speed of about 3 km/h (502b), for a mobile device moving at a speed of about 50 km/h (503b), for a mobile device moving at a speed of about 120 km/h (504b) and for a mobile device moving at a speed of about 250 km/h (505b).

Comparing the SIR characteristics as illustrated in FIGS. 5A and 5B, according to an example embodiment of the present invention an error in the SIR estimation is reduced more as compared to that of the prior art.

Particularly, with respect to a high-speed moving mobile device, the error in the SIR estimation for example embodiments of the present invention is less than 2 dB, whereas the maximum error in the SIR estimation is greater than about 10 dB as the Es/No increases. Therefore, according to an example embodiment of the present invention, the maximum error in the SIR estimation is reduced by 8 dB.

Figure 6A:
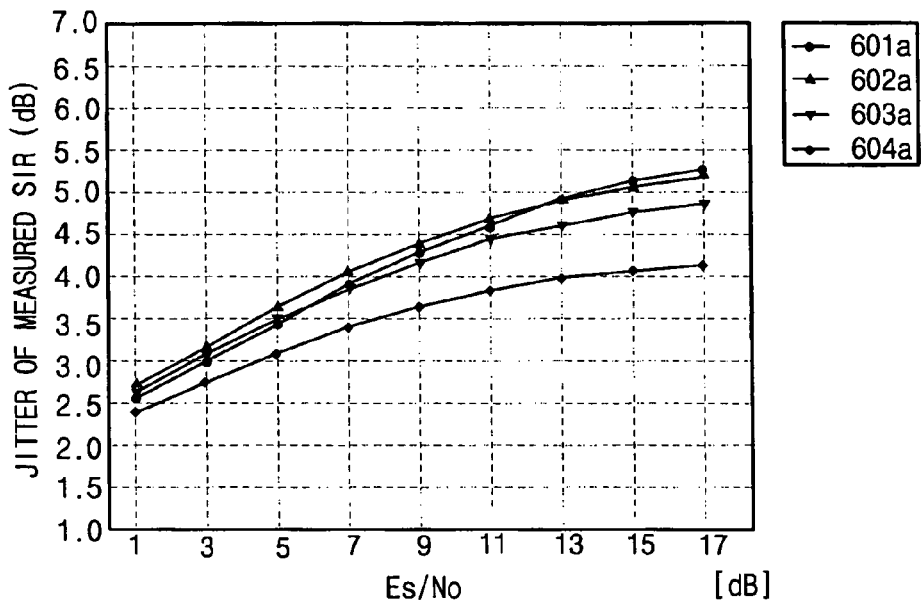
FIGS. 6A and 6B are graphs illustrating SIR jitter characteristics for a conventional SIR estimation method and for an example embodiment of the present invention, respectively.
Figure 6B:
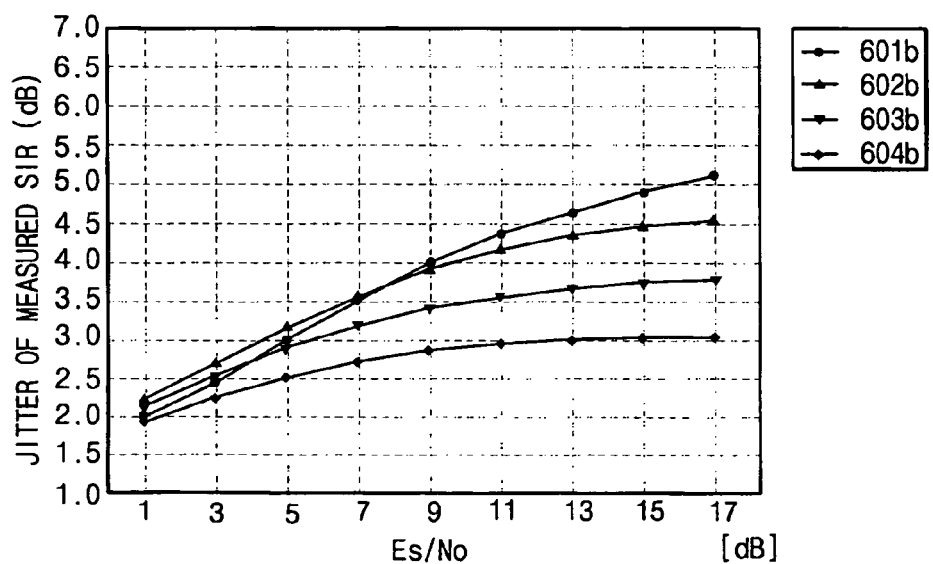

FIGS. 6A and 6B are graphs illustrating SIR jitter characteristics for a conventional SIR estimation method and for an example embodiment of the present invention.

Referring to FIG. 6A, the SIR jitter characteristics for the conventional SIR estimation are measured with respect to a mobile device moving at a speed of about 3 km/h (601a), a mobile device moving at a speed of about 50 km/h (602a), a mobile device moving at a speed of about 120 km/h (603a), and a mobile device moving at a speed of about 250 km/h (604a).

Similarly, referring to FIG. 6B, the SIR average characteristics are shown with respect to a mobile device moving at a speed of about 3 km/h (601b), a mobile device moving at a speed of about 50 km/h (602b), a mobile device moving at a speed of about 120 km/h (603b), and a mobile device moving at a speed of about 250 km/h (604b).

Comparing the SIR jitter characteristics in FIGS. 6A and 6B reveals that the SIR estimates according to an example embodiment of the present invention has overall improved jitter characteristics by about 1 dB than that of the prior art.

FIG. 7 is a table illustrating conditions of various parameters in simulations for FIGS. 4, 5B and 6B.

The parameters illustrates in FIG. 7 conform to the 3GPP standard and are used in the simulation for the SIR estimation in FIGS. 4, 5B and 6B.

According to an example embodiment of the present invention, in a closed-loop power control of the direct sequence code division multiple access (DS-CDMA) system, the power attenuation of a signal on a channel that is to be estimated may be compensated for so that the accuracy of the SIR estimation may be enhanced under the fading environment. Therefore, the power control of the closed-loop may be improved.

In addition, the SIR estimate may be used as status information for selecting a modulation and coding scheme (MCS) in a high speed downlink packet access (HSDPA) to improve the performance of the HSDPA.

What is claimed is:

1. A method of estimating a signal-to-interference ratio (SIR), comprising:

estimating a first average channel power per slot of a first channel that is under a fading environment;

estimating a second average channel power per slot of a second channel that is under a fading environment substantially the same as the fading environment of the first channel;

calculating a second signal power attenuation ratio of the second channel using the estimated second average channel power per slot of the second channel; and calculating a third average channel power per slot of the first channel using the estimated first average channel power per slot of the first channel and a reciprocal of the second signal power attenuation ratio of the second channel.

2. The method of claim 1, further comprising:

calculating an interference power of the first channel using the third average channel power per slot of the first channel;

summing the third average channel power per slot for respective paths;

summing the interference power of the first channel for respective paths; and estimating the signal-to-interference ratio (SIR) based on the summed third average channel power and the summed interference power of the first channel.

3. The method of claim 1, wherein the method of estimating the SIR is used for a wide-band code division multiple access (W-CDMA) system in accordance with a 3rd Generation Partnership Project (3GPP) standard.

4. The method of claim 3, wherein the first channel is a dedicated physical channel (DPCH), and the second channel is a common pilot channel (CPICH).

5. The method of claim 4, wherein the first average channel power per slot of the first channel is represented by the following equation:

$$E[\bar{Z}_{DPCH}]^2_{slot} = E_{c,dp} \cdot \left[ \left( \frac{1}{S_2} \frac{1}{N_2} \sum_{s=0}^{S_2-1} \sum_{k=0}^{N_2-1} [a(s,k) \cdot \cos\theta(s,k)] \right)^2 + \left( \frac{1}{S_2} \frac{1}{N_2} \sum_{s=0}^{S_2-1} \sum_{k=0}^{N_2-1} [a(s,k) \cdot \sin\theta(s,k)] \right)^2 \right] = E_{c,dp} \cdot K_{DPCH}$$

wherein,
$S_2$ denotes a number of DPCH symbols per slot,
$N_2$ denotes a spreading factor (SF) of DPCH,
$E_{c,dp}$ denotes an average chip energy of DPCH,
$\alpha(s,k)$ denotes an amplitude of an s-th symbol of a k-th chip due to the fading,
$\theta(s,k)$ denotes a phase of an s-th symbol of a k-th chip due to the fading, and
$K_{DPCH}$ denotes a first signal power attenuation ratio of DPCH.

6. The method of claim 4, wherein the second average channel power per slot of the second channel is represented by the following equation:

$$E[Z_{CPICH}]^2_{slot} = \frac{1}{2} \cdot E_{c,cp} \cdot G_p^2 \cdot \left[ \left( \frac{1}{S_1} \frac{1}{N_1} \sum_{s=0}^{S_1-1} \sum_{k=0}^{N_1-1} [a(s,k) \cdot \{\cos\theta(s,k) - \sin\theta(s,k)\}] \right)^2 + \left( \frac{1}{S_1} \frac{1}{N_1} \sum_{s=0}^{S_1-1} \sum_{k=0}^{N_1-1} [a(s,k) \cdot \{\sin\theta(s,k) + \cos\theta(s,k)\}] \right)^2 \right] = E_{c,cp} \cdot G_p^2 \cdot K_{CPICH}$$

wherein,
$S_1$ denotes a number of CPICH symbols per slot,
$N_1$ denotes spreading factor (SF) of the CPICH,
$E_{c,cp}$ denotes average chip energy of the CPICH,
$\alpha(s,k)$ denotes amplitude of an s-th symbol of a k-th chip due to the fading,
$\theta(s,k)$ denotes phase of an s-th symbol of a k-th chip due to the fading,
$K_{CPICH}$ denotes the second signal power attenuation ratio of the CPICH, and
$G_p$ denotes channel gain gap of the CPICH relative to the DPCH.

7. The method of claim 6, wherein the reciprocal of the second signal power attenuation ratio of the second channel is calculated as equation 2, where an average power per slot for a square of the CPICH symbol is calculated as equation 1:

$$E[(Z_{CPICH})^2]_{slot} = E_{c,cp} \cdot G_p^2 \cdot \frac{N_0}{N_1} \quad \text{[Equation 1]}$$

$$\hat{\delta}(l,k) = \frac{E[(Z_{CPICH})^2]_{slot}}{E[Z_{CPICH}]^2_{slot}} = \frac{1}{K_{CPICH}} + \frac{1}{K_{CPICH}} \cdot \frac{N_0}{N_1} \quad \text{[Equation 2]}$$

wherein, $$\frac{N_0}{N_1}$$

approaches zero so that $$\hat{\delta}(l,k) \cong \frac{1}{K_{CPICH}}$$

and wherein,
$N_0$ denotes spreading factor (SF) of the CPICH,
$N_1$ denotes spreading factor (SF) of the CPICH,
$E_{c,cp}$ denotes average chip energy of the CPICH,
$G_p$ denotes difference in channel gain between the CPICH and the DPCH, and
$K_{CPICH}$ denotes the second signal power attenuation ratio of the CPICH.

8. The method of claim 1, wherein method of estimating the SIR is used for a code divisional multiple access (CDMA) system in accordance with an IS-95 standard.

9. The method of claim 8, wherein the first channel is a traffic channel, and the second channel is a pilot channel.

10. A method of estimating a signal-to-interference ratio (SIR), comprising:
    estimating a first average channel power per slot of a first channel that is under a fading environment;
    estimating a second average channel power per slot of a second channel that is under a fading environment substantially the same as the fading environment of the first channel;
    calculating a second signal power attenuation ratio of the second channel using the estimated second average channel power per slot of the second channel;
    calculating a third average channel power per slot of the first channel using a result of the multiplication of the estimated first average channel power per slot of the first channel and a reciprocal of the second signal power attenuation ratio of the second channel;
    estimating a signal-to-interference ratio (SIR) using the third average channel power per slot of the first channel that compensates for the signal power attenuation of the first channel; and
    comparing the estimated signal-to-interference ratio (SIR) with a reference signal-to-interference ratio (SIR) to generate a power control signal according to a comparison result.

11. The method of claim 10, wherein the estimating of the signal-to-interference ratio (SIR) includes:
    calculating an interference power of the first channel using the third average channel power per slot of the first channel;
    summing the third average channel power per slot for respective paths;
    summing the interference power of the first channel for respective paths; and estimating the signal-to-interference ratio (SIR) by dividing the summed third average channel power with the summed interference power of the first channel.

12. The method of claim 10, wherein the first average channel power per slot of the first channel is represented by the following equation:

$$E[\bar{Z}_{DPCH}]^2_{slot} = E_{c,dp} \cdot \left[ \left( \frac{1}{S_2} \frac{1}{N_2} \sum_{s=0}^{S_2-1} \sum_{k=0}^{N_2-1} [a(s,k) \cdot \cos\theta(s,k)] \right)^2 + \left( \frac{1}{S_2} \frac{1}{N_2} \sum_{s=0}^{S_2-1} \sum_{k=0}^{N_2-1} [a(s,k) \cdot \sin\theta(s,k)] \right)^2 \right] = E_{c,dp} \cdot K_{DPCH}$$

wherein,
$S_2$ denotes a number of DPCH symbols per slot,
$N_2$ denotes spreading factor (SF) of the DPCH,
$E_{c,dp}$ denotes average chip energy of the DPCH,
$\alpha(s,k)$ denotes amplitude of an s-th symbol of a k-th chip due to the fading,
$\theta(s,k)$ denotes phase of an s-th symbol of a k-th chip due to the fading, and
$K_{DPCH}$ denotes a first signal power attenuation ratio of the DPCH.

13. The method of claim 10, wherein the second average channel power per slot of the second channel is represented by the following equation:

$$E[Z_{CPICH}]^2_{slot} = \frac{1}{2} \cdot E_{c,cp} \cdot G_p^2 \cdot \left[ \left( \frac{1}{S_1} \frac{1}{N_1} \sum_{s=0}^{S_1-1} \sum_{k=0}^{N_1-1} [a(s,k) \cdot \{\cos\theta(s,k) - \sin\theta(s,k)\}] \right)^2 + \left( \frac{1}{S_1} \frac{1}{N_1} \sum_{s=0}^{S_1-1} \sum_{k=0}^{N_1-1} [a(s,k) \cdot \{\sin\theta(s,k) + \cos\theta(s,k)\}] \right)^2 \right] = E_{c,cp} \cdot G_p^2 \cdot K_{CPICH}$$

wherein,
$S_1$ denotes a number of CPICH symbols per slot,
$N_1$ denotes spreading factor (SF) of the CPICH,
$E_{c,cp}$ denotes average chip energy of the CPICH,
$\alpha(s,k)$ denotes amplitude of an s-th symbol of a k-th chip due to the fading,
$\theta(s,k)$ denotes phase of an s-th symbol of a k-th chip due to the fading,
$K_{CPICH}$ denotes the second signal power attenuation ratio of the CPICH, and
$G_p$ denotes difference in channel gain between the CPICH and the DPCH.

14. The method of claim 10, wherein the reciprocal of the second signal power attenuation ratio of the second channel is calculated as equation 2, where an average power per slot for a square of the CPICH symbol is calculated as equation 1:

$$E[(Z_{CPICH})^2]_{slot} = E_{c,cp} \cdot G_p^2 \cdot \frac{N_0}{N_1} \quad \text{[Equation 1]}$$

$$\hat{\delta}(l,k) = \frac{E[(Z_{CPICH})^2]_{slot}}{E[Z_{CPICH}]^2_{slot}} = \frac{1}{K_{CPICH}} + \frac{1}{K_{CPICH}} \cdot \frac{N_0}{N_1} \quad \text{[Equation 2]}$$

wherein $$\frac{N_0}{N_1}$$

approaches zero so that $$\hat{\delta}(l,k) \cong \frac{1}{K_{CPICH}}$$

and wherein,
$N_0$ denotes spreading factor (SF) of the CPICH,
$N_1$ denotes spreading factor (SF) of the CPICH,
$E_{c,cp}$ denotes average chip energy of the CPICH,
$G_p$ denotes channel gain gap of the CPICH relative to the DPCH, and
$K_{CPICH}$ denotes the second signal power attenuation ratio of the CPICH.

15. An apparatus to estimate a signal-to-interference ratio (SIR), the apparatus comprising:
a first channel signal power estimation unit configured to estimate a first average signal power per slot of a first channel;
a second channel signal power estimation unit configured to estimate a signal power attenuation ratio of a second channel;
a signal power compensation unit configured to output a compensated third average channel power per slot of the first channel by multiplying a reciprocal of the signal power attenuation ratio of the second channel by the first average signal power per slot of the first channel;
an interference power estimation unit configured to estimate an interference power of the first channel; and
a signal-to-interference calculation unit configured to calculate the signal-to-interference ratio (SIR) by dividing the compensated third average channel power per slot of the first channel that are summed for respective paths with the interference power of the first channel that are summed for respective paths.

16. The apparatus of claim 15, wherein the first signal power estimation unit includes:
an averaging unit configured to calculate an average value of symbol signals in each slot of the first channel;
a squarer configured to calculate the first average channel power per slot of the first channel by squaring the average value of the symbol signals in each slot of the first channel; and
a low pass filter configured to stabilize an effect of fading on the first average power per slot of the first channel.

17. The apparatus of claim 15, wherein the second channel signal power estimation unit includes:
a first averaging unit configured to calculate an average value of symbol signals in each slot of the second channel;
a first squarer configured to calculate a second average channel power per slot of the second channel by squaring the average value of the symbol signals in each slot of the second channel;
a first low pass filter configured to stabilize a fading effect on the second average channel power per slot of the second channel;
a second squarer configured to square the symbol signal of the second channel;
a second averaging unit configured to calculate an average value of a squared symbol signal of the second channel;

a second low pass filter configured to stabilize a fading effect on the average value of the squared symbol signal of the second channel; and a division unit configured to generate the reciprocal of the signal power attenuation ratio by dividing an output of the second low pass filter with an output of the first low pass filter.

18. The apparatus of claim 15, wherein the signal power compensation unit includes:

a multiplication unit configured to output the compensated third average channel power per slot of the first channel by multiplying the reciprocal of the signal power attenuation ratio of the second channel by the first average channel power per slot of the first channel.

19. The apparatus of claim 15, wherein the interference power estimation unit includes:

a squarer configured to square a symbol signal on the first channel;

an averaging unit configured to calculate an average value of a squared symbol signal in each slot of the first channel;

a low pass filter configured to stabilize fading effect on the average value of the squared symbol signal in each slot of the first channel;

a subtraction unit configured to subtract the compensated third average channel power per slot of the first channel from an output of the low pass filter;

an absolute value calculation unit configured to calculate an absolute value of an output of the subtraction unit; and a filter unit configured to filter an output of the absolute value calculation unit based on a forgetting factor.

20. The apparatus of claim 15, wherein the signal-to-interference calculation unit includes:

a first summer configured to sum the compensated third average channel power per slot of the first channel for respective paths;

a second summer configured to sum the interference power of the first channel for respective paths; and a division unit configured to calculate the signal-to-interference ratio (SIR) by dividing the summed compensated third average power per slot of the first channel with the summed interference power of the first channel.

* * * * *